(12) United States Patent
Bunk et al.

(10) Patent No.: US 8,062,393 B2
(45) Date of Patent: Nov. 22, 2011

(54) SOLIDS MIXING METHOD

(75) Inventors: Stanley A. Bunk, Rancho Cucamonga, CA (US); Eric Eccleston, Pasadena, CA (US); Eric Wagner, La Canada Flintridge, CA (US)

(73) Assignee: Technip USA, Inc., Claremont, CA (US)

( * ) Notice: Subject to any disclaimer, the term of this patent is extended or adjusted under 35 U.S.C. 154(b) by 637 days.

(21) Appl. No.: 12/286,809

(22) Filed: Oct. 2, 2008

(65) Prior Publication Data
US 2010/0083576 A1    Apr. 8, 2010

(51) Int. Cl.
C01B 3/36      (2006.01)
C10J 3/54      (2006.01)
C10L 1/00      (2006.01)

(52) U.S. Cl. ............ 48/197 R; 48/209; 48/210; 44/307; 44/606; 44/628

(58) Field of Classification Search ................ 48/197 R, 48/209, 210; 44/307, 606, 628
See application file for complete search history.

(56) References Cited

U.S. PATENT DOCUMENTS

| 4,147,593 A * | 4/1979 | Frischmuth et al. ............. 201/21 |
| 4,166,786 A * | 9/1979 | Duraiswamy et al. ......... 208/410 |
| 4,243,489 A * | 1/1981 | Green ............................. 201/12 |
| 2010/0101146 A1 * | 4/2010 | Fujimori et al. ................ 48/210 |

* cited by examiner

Primary Examiner — Timothy Vanoy
(74) Attorney, Agent, or Firm — R. Perry McConnell

(57) ABSTRACT

A process for providing fast pyrolysis or gasification of feed material, such as biomass, by mixing it with inert inorganic hot solids in a fluidized mixer/reactor and utilizing released gas from the resulting reaction to transport the mixture from the mixer/reactor.

15 Claims, 1 Drawing Sheet

SOLIDS MIXING METHOD

FIELD OF THE INVENTION

The invention pertains to the production and recovery of gaseous and condensable fuels from a feed material with a high organic content.

BACKGROUND OF THE INVENTION

Pyrolysis of organic materials is an important technique in processing feed material with a high organic content to obtain gaseous and condensable fuels. Pyrolysis of biomass materials is of increasing interest because it can produce high yields of combustible products and is considered a "green" (low-polluting, environmentally friendly) process.

Pyrolysis is a process whereby organic containing feed materials are heated in a reducing or inert environment to produce combustible organic vapors (oils, tars, etc), non-condensable gases, including synthesis gas ("syngas"), as well as char and ash. "Fast Pyrolysis" is a pyrolysis technique in which the organic feed material is heated very rapidly and exposed to elevated temperatures for relatively short time periods (less than three seconds). Fast pyrolysis usually results in greater yields of condensable oils compared to other pyrolysis techniques. However, it is very difficult to contact high temperature abrasive inert solids with a low temperature, single phase (solid or liquid) or two phase (liquid/solid) reactive material to rapidly obtain a physically and chemically homogeneous mixture.

One method of fast pyrolysis involves mixing of an ambient-temperature feed material, such as coal, biomass, or another organic material with inert hot solids, such as silica, olivine, alumina, or other materials that may be available. It is desirable that this mixing occurs in an environment with little or no oxygen, and that thorough mixing producing an essentially uniform mixture occurs very rapidly.

When this process is correctly controlled, free moisture is evaporated and most of the high molecular weight organics within the feed are "cracked" or volatilized to lower molecular weight compounds that are in the vapor phase at the reaction temperature. The balance of the material remains as a solid in the form of a very high carbon content, substantially inorganic char/ash. This fast pyrolysis process requires rapid mixing of different solids. However, the characteristics of the materials to be mixed, such as temperature, density, size distribution, etc., may be quite different. Because the resulting mixture must be substantially uniform, rapid mixing may be difficult to achieve in the mixing device.

Further, the residence times and temperatures of the solids and gases resulting from the pyrolysis within the mixing device can greatly affect the result. For example, short residence times of less than three seconds and temperatures between approximately 700 and 1100 degrees Fahrenheit promote formation of organics that may be condensed and recovered as liquids. This is an example of "fast pyrolysis," of feed material to produce organic liquids for use in power generation or for the production of transportation fuels. Longer residence times of over five seconds at higher temperatures in the range of approximately 1300 degrees Fahrenheit or more promote additional cracking resulting in a higher yield of low molecular weight products (gasification), and formation of reduced quantities of condensable organics.

There have been prior attempts to efficiently implement fast pyrolysis. For example, U.S. Pat. Nos. 5,792,340 and 5,961,786 to Freel, et al. disclose the use of a mixing section for rapidly mixing carbonaceous feedstock and an inorganic particulate heat medium while using transport gas to entrain the mixture into a reactor section for pyrolysis. However, these patents disclose a process with a limited heat carrier density, which is maintained within 4.5 to 18.6 million particles per cubic foot of reactor volume. Moreover, this process requires the use of transport gas to move the mixture from the mixing section through the reactor.

Accordingly, it is desirable to provide a process for fast pyrolysis or gasification that will provide efficient conversion of feed stocks and avoid the use of transport gas.

It is further desirable to provide a process for fast pyrolysis or gasification with applicability to emerging fields of alternate energy production (e.g., pyrolysis of biomass), as well as classical refining operations (e.g., fluidized catalytic cracking).

SUMMARY OF THE INVENTION

The invention comprises a fast pyrolysis process in which mixing and pyrolysis occurs in a mixing zone comprising a fluid bed, and whereby gases produced by the pyrolysis process provide the majority of the gas required to transport the resulting mixture of char, ash, and hot inert solids out of the mixing zone and through the reactor. Feed material, such as coal, biomass, or another organic material is introduced to a fluid bed, and mixed with inert hot solids, such as silica, olivine, alumina, or other materials that may be available. Biomass useful as feed material may comprise plant materials typically high in cellulose and hemi-cellulose such as switch grass, elephant grass, woody materials, waste materials from wood processing such as saw dust or wood chips, or animal waste materials. Feed materials may be mechanically or pneumatically transported into the mixing zone of the reactor, but it is preferable to avoid the use of transport gas for this purpose. It is desirable to utilize hot solids with a particle density of greater than 100 million particles per cubic foot of reactor volume, and preferably greater than 500 million particles per cubic foot of reactor volume. In a preferred embodiment of the process, the inert hot solids are introduced into the mixing zone in a weight ratio to the feed material of between 5:1 to 12:1, and more preferably be present in a weight ratio of approximately 8:1.

As a result of this mixing, moisture in the feed material is freed and vaporized, at least some of the organic components present in the feed material are cracked into shorter molecular chains, and a large volume of gas is released. Most, if not all, of the gas released by this process is released in the mixing zone. This gas is then immediately utilized to transport the mixture from the mixing zone of the fluid bed reactor into and through a transport section. The cross-sectional area of the transport section is preferably reduced from that of the mixing zone of the fluid bed reactor to ensure entrainment and transport of the mixture solids.

In a preferred embodiment of the invention, reaction temperatures are maintained in the range of approximately 700-1100 degrees Fahrenheit, and retention times in the mixing zone and transport section of the reactor are maintained at less than about three seconds.

Upon initial start-up of the fluid bed reactor, injection of transport gas, such as nitrogen, in addition to a relatively small amount of fluidizing gas may be required to obtain initial transport of the post-reaction solids from the mixing zone. However, once the reactor is hot and in steady-state operation, the use of such transport gas may be significantly reduced or omitted. In some cases, it may be desirable to continue use of small amounts of fluidizing gas to assist in controlling retention times of the mixture in the reactor.

As feed material and inert hot solids are fed into the mixing zone, it is desirable to maintain a depth of material that will continue the fast pyrolysis reaction and allow the released gas to efficiently transport solids from the mixing zone. Those of skill in the art will recognize that these considerations are a matter of engineering choice.

As gas and solids exit the transport section, solids and gases are separated and the inert solids and char may be separated from gases (primarily water vapor and organics), then recirculated to another reactor for regeneration by oxidation and return to the mixing zone of the fluid bed reactor. The gas product stream may then be further processed as desired.

Those of skill in the art will recognize that certain features of the fluid bed reactor are a matter of engineering choice and preference, and may be altered without departing from the spirit of the invention. For example, the number, size, and placement of ports or nozzles for the delivery of feed material, hot inert solids, and fluidizing gas may be chosen as a matter of preference, or to allow control of the reaction and retention time in the reactor.

DETAILED DESCRIPTION

Figure 1:
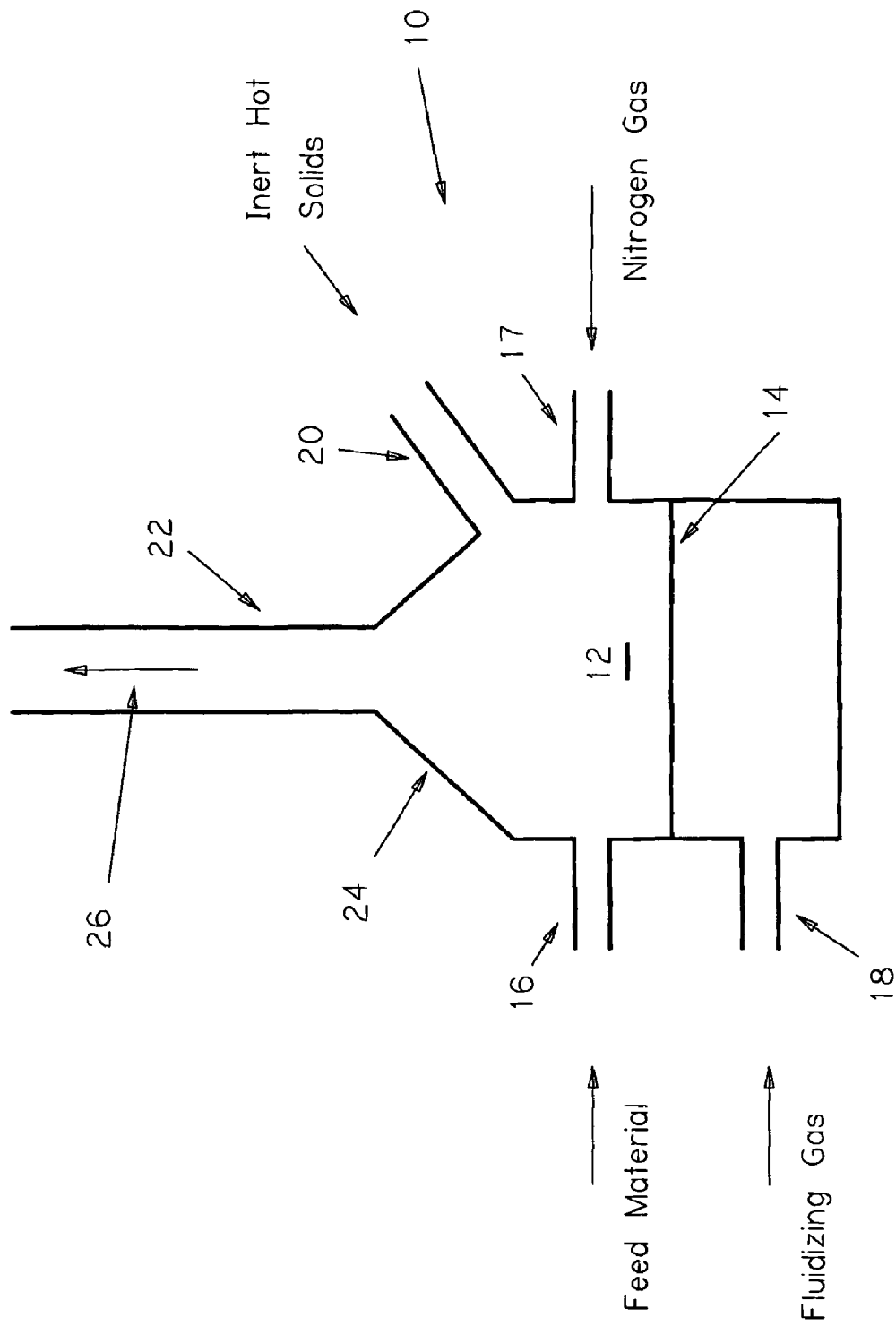
FIG. 1 is a schematic sectional view of a fluid bed reactor for use in practicing the invention.

Referring to FIG. 1, a fluid bed reactor for use in practicing the present invention is shown. Fluid bed reactor vessel 10 comprises a mixing zone 12, a fluidizing gas plenum 14, and fluidizing gas inlet 18. Fluid bed reactor vessel 10 additionally comprises a feed material inlet 16, a inert hot solids inlet 20, and may comprise a transport gas inlet 17.

Feed material, such as coal, biomass, or another organic material is introduced into the fluid bed reactor vessel 10 via feed material inlet 16, and mixed with inert hot solids, such as silica, olivine, alumina, or other materials that may be available, that are introduced into fluid bed reactor vessel 10 via inert hot solids inlet 20. It is desirable to utilize hot solids with a particle density of greater than 100 million particles per cubic foot of reactor volume, and preferably greater than 500 million particles per cubic foot of reactor volume. In a preferred embodiment of the process, the inert hot solids are present in a weight ratio to the feed material of between 5:1 to 12:1, and may more preferably be present in a weight ratio of 8:1.

As a result of this mixing, water from the feed material is freed and vaporized, at least some of the organic materials present in the feed material are cracked into shorter molecular chains, and a large amount of gas is released. This gas is then immediately utilized to transport the mixture from the mixing zone 12 into a transport section 22 as transport stream 26 for delivery and further processing. The cross-sectional area of the transport section 22 is preferably reduced from that of the mixing zone 12 by passage through constriction zone 24 to ensure entrainment and transport of the mixture solids.

In a preferred embodiment of the invention, reaction temperatures in the mixing zone 12 and transport section 22 are maintained in the range of approximately 700-1100 degrees Fahrenheit, and retention times in the mixing zone 12 are maintained at less than three seconds.

Upon initial start-up, injection of a relatively small amount of transport gas via transport gas inlet nozzle 17 may be required to obtain initial transport of the post-reaction solids from the mixing zone 12. However, once the reactor is hot and in steady-state operation, the use of such transport gas may be significantly reduced or omitted. In some cases, it may be desirable to continue use of transport gas to assist in controlling retention times in the mixing zone 12 and transport section 22.

As those of skill in the art will appreciate, certain features of fluid bed reactor vessel 10, such as, for example, the number, sizing, and positioning of feed material inlets 16, fluidizing gas inlets 18, nitrogen gas inlets 17, and inert hot solids inlets 20 are matters of engineering choice, and such features may be altered to adjust for flow characteristics of a particular reactor. Accordingly, the descriptions above are by way of example only, and do not restrict the scope of the present invention.

We claim:

1. A method of producing gaseous and condensable fuels from an organic feed material, comprising the steps of
    introducing a feed material into a fluid bed,
    mixing an inorganic heat source with said feed material in said fluid bed,
    releasing gas from said feed material in said fluid bed,
    using said released gas as a transport stream to entrain solids remaining from said feed material and said inorganic heat source, and
    reducing the cross-sectional area of said transport stream to ensure that the solids are entrained.

2. The method of claim 1, wherein the step of releasing gas from said feed material in said fluid bed additionally comprises the step of vaporizing free water from said feed material.

3. The method of claim 1, wherein the step of releasing gas from said feed material in said fluid bed additionally comprises the step of cracking some organic molecules in said feed material into shorter chain molecules.

4. The method of claim 1, wherein the step of introducing an inorganic heat source into said fluid bed additionally comprises the step of introducing said inorganic heat source in a weight ratio to said feed material in the range of approximately between 5:1-12:1.

5. The method of claim 1, additionally comprising the step of maintaining a particle density of greater than 100 million particles per cubic foot of reactor volume.

6. The method of claim 1, additionally comprising the step of maintaining a particle density of greater than 500 million particles per cubic foot of reactor volume.

7. The method of claim 1, wherein the step of introducing a feed material into a fluid bed additionally comprises the step of using coal as said feed material.

8. The method of claim 1, wherein the step of introducing a feed material into a fluid bed additionally comprises the step of using biomass as said feed material.

9. The method of claim 1, wherein the step of introducing an inorganic heat source into said fluid bed additionally comprises the step of using heated silica as said inorganic heat source.

10. The method of claim 1, wherein the step of introducing an inorganic heat source into said fluid bed additionally comprises the step of using heated olivine as said inorganic heat source.

11. The method of claim 1, wherein the step of introducing an inorganic heat source into said fluid bed additionally comprises the step of using heated alumina as said inorganic heat source.

12. The method of claim 1, additionally comprising the step of retaining said feed material and said inorganic heat source in said fluid bed for less than three seconds.

13. The method of claim 1, wherein the step of mixing an inorganic heat source with said feed material in said fluid bed additionally comprises the step of maintaining a temperature during mixing of between approximately 700 and 1100 degrees Fahrenheit.

14. The method of claim 1, additionally comprising the step of introducing nitrogen gas into said fluid bed to assist in the transport of said transport stream.

15. The method of claim 1, additionally comprising the step of introducing nitrogen gas into said fluid bed to control retention times of said mixture in said fluid bed.

* * * * *